(12) United States Patent
Noda et al.

(10) Patent No.: US 10,179,317 B2
(45) Date of Patent: Jan. 15, 2019

(54) GAS GENERATOR

(71) Applicant: DAICEL CORPORATION, Osaka-shi, Osaka (JP)

(72) Inventors: Akifumi Noda, Tatsuno (JP); Haruhiko Yamashita, Tatsuno (JP); Yusuke Komine, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 110 days.

(21) Appl. No.: 15/313,919

(22) PCT Filed: Jun. 2, 2015

(86) PCT No.: PCT/JP2015/065829
§ 371 (c)(1),
(2) Date: Nov. 23, 2016

(87) PCT Pub. No.: WO2015/198802
PCT Pub. Date: Dec. 30, 2015

(65) Prior Publication Data
US 2017/0151543 A1    Jun. 1, 2017

(30) Foreign Application Priority Data
Jun. 23, 2014   (JP) .................. 2014-127953

(51) Int. Cl.
*B60R 21/26*     (2011.01)
*B01J 7/00*      (2006.01)
*B60R 21/264*    (2006.01)

(52) U.S. Cl.
CPC .............. *B01J 7/00* (2013.01); *B60R 21/264* (2013.01); *B60R 2021/26076* (2013.01)

(58) Field of Classification Search
CPC .......... B60R 2021/26076; B60R 21/26; B60R 2021/26041
See application file for complete search history.

(56) References Cited

U.S. PATENT DOCUMENTS 3,649,045 A    3/1972  Smith et al.
5,551,724 A *  9/1996  Armstrong, III .... B01D 39/086
                                             280/737

(Continued)

FOREIGN PATENT DOCUMENTS

JP    2010-264773 A    11/2010
JP    2010-280376 A    12/2010
JP    2011-157025 A     8/2011

*Primary Examiner* — James A English
(74) *Attorney, Agent, or Firm* — Birch, Stewart, Kolasch & Birch, LLP

(57) ABSTRACT

A gas generator includes, a cylindrical housing provided with an ignition device and a diffuser, and an inner cylindrical member defining a gap with an inner circumferential wall surface of the cylindrical housing and leading to a gas discharge port. The inner cylindrical member is formed of a plurality of cylindrical members having gas inlet-outlet holes and connected in an axial direction. An opening of each of the cylindrical members has concave-convex portions for fitting the cylindrical members together. Both ends of the connected cylindrical members have a first protrusion on a side of the ignition device serving as a first abutment portion, and a second protrusion on the side of the diffuser portion serving as a second abutment portion. The first and second abutment portions abut the inner circumferential wall surface of the cylindrical housing and have a hole or a cutout to allow a gas to pass.

13 Claims, 3 Drawing Sheets

(56) References Cited

U.S. PATENT DOCUMENTS

| | | | |
|---|---|---|---|
| 5,836,608 A * | 11/1998 | Soderquist | B60R 21/217 |
| | | | 280/728.2 |
| 6,070,903 A * | 6/2000 | Beisswenger | B60R 21/213 |
| | | | 280/736 |
| 7,343,862 B2 * | 3/2008 | McCormick | B60R 21/261 |
| | | | 102/530 |
| 7,568,728 B2 * | 8/2009 | Smith | B60R 21/2644 |
| | | | 280/736 |
| 7,654,565 B2 | 2/2010 | McCormick et al. | |
| 8,702,125 B1 * | 4/2014 | Smith | B60R 21/26 |
| | | | 280/740 |
| 9,428,142 B2 * | 8/2016 | Divo | B60R 21/264 |
| 9,950,688 B2 * | 4/2018 | Yamashita | B60R 21/261 |
| 2005/0230949 A1 * | 10/2005 | Blackburn | B60R 21/2644 |
| | | | 280/736 |
| 2008/0078486 A1 * | 4/2008 | Khandhadia | C06B 31/08 |
| | | | 149/109.2 |
| 2010/0290959 A1 | 11/2010 | Yamazaki et al. | |
| 2010/0307775 A1 | 12/2010 | Robbins et al. | |
| 2011/0187088 A1 | 8/2011 | Hanano et al. | |
| 2014/0230685 A1 * | 8/2014 | Hanano | B60R 21/2644 |
| | | | 102/530 |
| 2016/0214564 A1 * | 7/2016 | Imoto | B60R 21/2644 |
| 2017/0050609 A1 * | 2/2017 | Yamashita | B60R 21/261 |

\* cited by examiner

[Fig. 1]
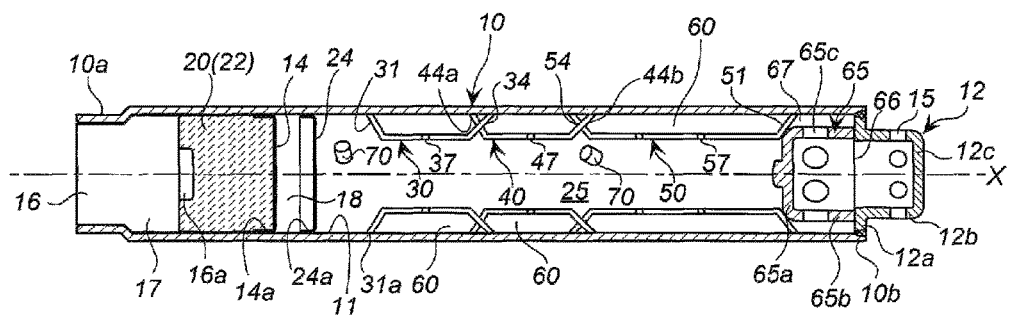
[Fig. 2]
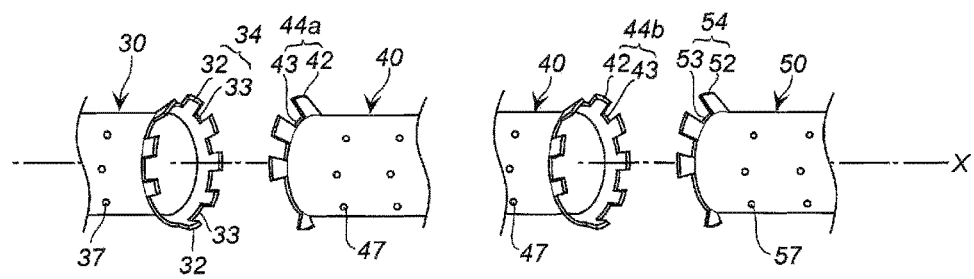
[Fig. 3]
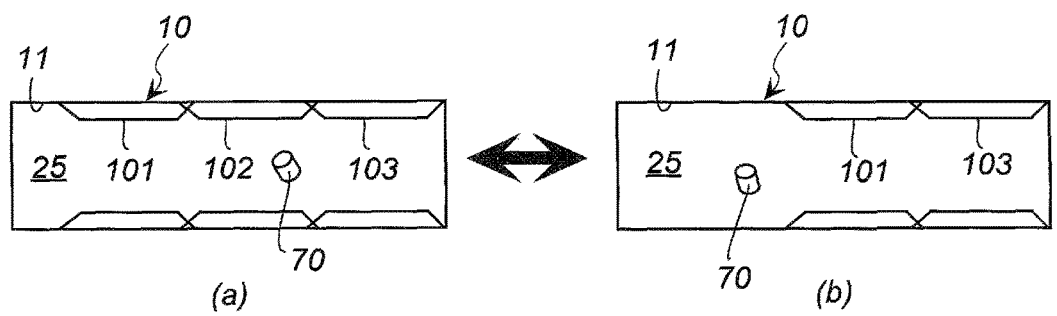

[Fig. 4]
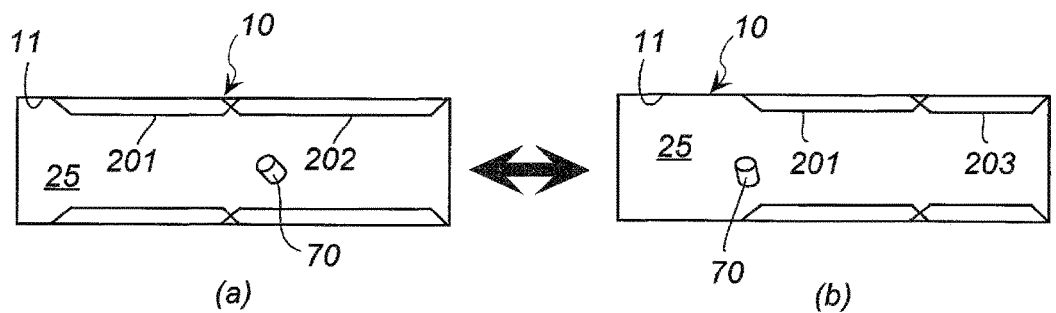
[Fig. 5]
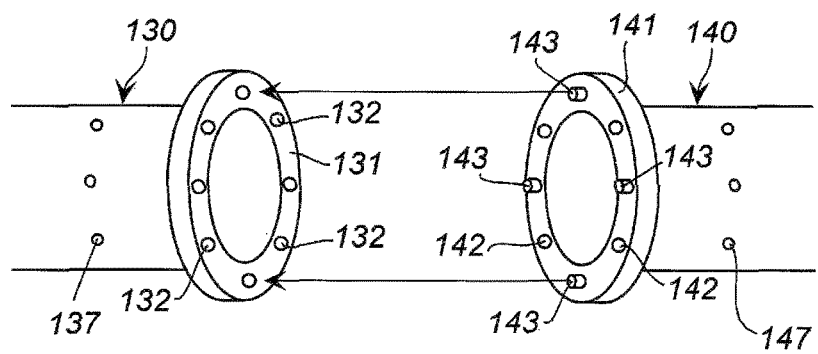
[Fig. 6]
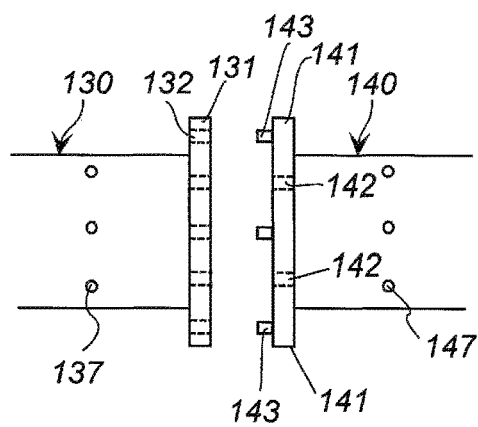

[Fig. 7]
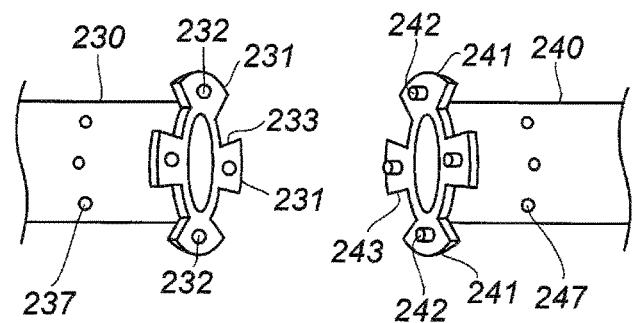
[Fig. 8]
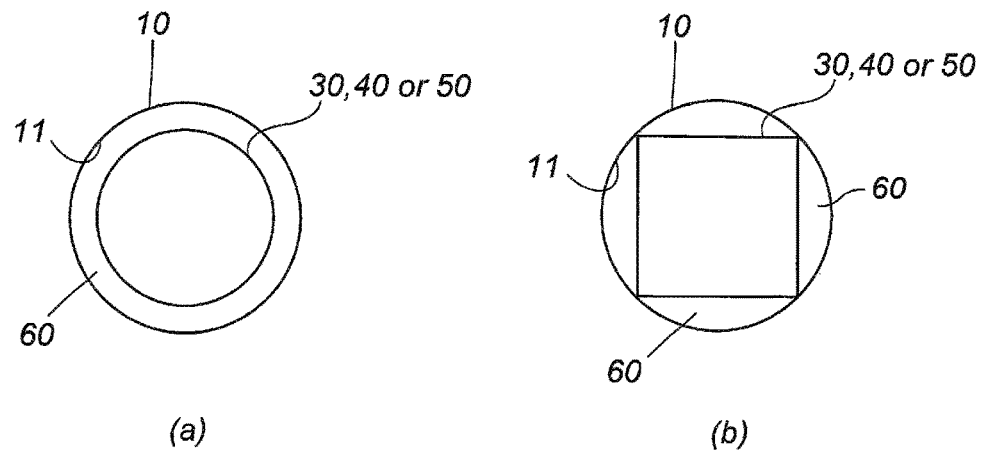
(a)　　　　　　　　　(b)

GAS GENERATOR

TECHNICAL FIELD

The present invention relates to a gas generator used for an airbag apparatus to be installed in a vehicle.

DESCRIPTION OF RELATED ART

A gas generator is known in which an igniter is attached at one end of an elongated housing, a diffuser portion is attached at the other end and a gas generating agent is charged in a space therebetween (a combustion chamber).

With such a gas generator, during actuation, combustion of the gas generating agent is started from the side close to the igniter and the combustion advances towards the diffuser portion on the opposite side. The resulting problem is that the gas generating agent close to the igniter burns easily, whereas the gas generating agent at a position distant from the igniter does not burn easily.

For resolving this problem, a gas generator is known in which an inner cylindrical member is disposed such that a gap is formed between the inner circumferential wall surface of a housing and the outer circumferential wall surface of the inner cylindrical member and the gap is used as a gas discharge path, so that the combustion of the gas generating agent is promoted in the entire combustion chamber (FIGS. 1 to 4 of US-B No. 7654565).

In the gas generator disclosed in US-B No. 7654565 (FIG. 1), an inner housing 22 forming a combustion chamber 22a is disposed inside an outer housing 12, and an annular gas flow passage 23 is formed between the inner housing and the outer housing 12. An igniter assembly 20 is disposed at one end of a gas generator 10, and a nozzle 12d formed with a gas exit orifice 12e is disposed at the opposite end.

One end of the inner housing 22 is abutted against a baffle member 34 arranged on the side of the nozzle 12d, and the opposite end thereof is abutted against an ignition cup 16 arranged on the side of the igniter assembly 20. The inner housing 22 is formed of a single member continuous from the baffle member 34 to the ignition cup 16.

FIG. 2 of JP-A No. 2011-157025 also discloses a gas generator in which a single cylindrical member 30 is disposed inside a cylindrical housing 10, and a second gas generating agent 50 is charged into the cylindrical member.

SUMMARY OF INVENTION

The Invention 1 of the present invention provides a gas generator, including:

a cylindrical housing in which an ignition device is disposed at a first end thereof and a diffuser portion provided with a gas discharge port is disposed at a second end thereof, axially opposite to the first end, an inner cylindrical member being disposed inside the cylindrical housing to form a gap with an inner circumferential wall surface of the cylindrical housing, a gas generating agent being charged inside a space including an inside of the inner cylindrical member, the gap, between inner circumferential wall surface of the cylindrical housing and the inner cylindrical member, serving as a gas discharge path leading to the gas discharge port, the inner cylindrical member being formed of a plurality of cylindrical members which are connected to each other in an axial direction, a circumference wall of each of the cylindrical members having a plurality of gas inlet-outlet holes for communicating the inside of each of the cylindrical members with the gap serving as the gas discharge path, an opening of each of the plurality of cylindrical members being provided with a concave-convex portion that serves as a connecting portion of each of the cylindrical members and is connected by fitting together, the concave-convex portion to serve as the connecting portions including, a combination of a plurality of convex portions protruding radially outwardly and obliquely and a plurality of concave portions present between adjacent convex portions, provided at the opening of one cylindrical member to be connected, and a combination of a plurality of convex portions protruding radially outwardly and obliquely and a plurality of concave portions present between adjacent convex portions, provided at the opening of the other cylindrical member to be connected, the connected plurality of cylindrical members having a protrusion, which protrudes outward in the radial direction, at an end portion on the side of the ignition device and at an end portion on the side of the diffuser portion, the connecting portions of the plurality of cylindrical members being connected with each other such that the respective concave portions are fitted to and engaged with the respective convex portions, an outer circumferential portion of a first protrusion on the side of the ignition device serving as a first abutment portion and being abutted against the inner circumferential wall surface of the cylindrical housing, a surface of a second protrusion on the side of the diffuser portion serving as a second abutment portion and being abutted against part of the diffuser portion directly or with another member interposed therebetween, the connecting portions of the plurality of cylindrical members being abutted against the inner circumferential wall surface of the cylindrical housing, the connecting portions, the first abutment portion, and the second abutment portion having a hole or a gap which allows gas to pass therethrough.

The Invention 2 of the present invention provides a gas generator, including:

a cylindrical housing in which an ignition device is disposed at a first end thereof and a diffuser portion provided with a gas discharge port is provided at a second end thereof axially opposite to the first end, an inner cylindrical member being disposed inside the cylindrical housing to form a gap with an inner circumferential wall surface of the cylindrical housing, a gas generating agent being charged inside a space including an inside of the inner cylindrical member, the gap, between the inner circumferential wall surface of the cylindrical housing and the inner cylindrical member, serving as a gas discharge path leading to the gas discharge port, the inner cylindrical member being formed of a plurality of cylindrical members which are connected to each other in an axial direction, a circumference wall of each of the cylindrical members having a plurality of gas inlet-outlet holes for communicating the inside of each of the cylindrical members with the gap serving as the gas discharge path, an opening of each of the plurality of cylindrical members being provided with a flange that serves as a connecting portion of the respective cylindrical members and is abutted with each other, the connected plurality of cylindrical members having a protrusion, which protrudes outward in the radial direction, at an end portion on the side of the ignition device and at an end portion on the side of the diffuser portion, in the connecting portions of the connected plurality of cylindrical members, respective flanges being abutted against each other, an outer circumferential portion of a first protrusion on the side of the ignition device serving as a first abutment portion and being abutted against the inner circumferential wall surface of the cylindrical housing, and a surface of a second protrusion on the side of the diffuser portion serving as a second abutment portion and being abutted against part of the diffuser portion directly or with another member interposed therebetween, the connecting portions, the first abutment portion, and the second abutment portion having a hole or a gap which allows gas to pass therethrough.

The Invention 3 of the present invention provides a gas generator, including:

a cylindrical housing in which an ignition device is disposed at a first end thereof and a diffuser portion provided with a gas discharge port is disposed at a second end thereof axially opposite to the first end, an inner cylindrical member being disposed inside the cylindrical housing to form a gap with an inner circumferential wall surface of the cylindrical housing, a gas generating agent being charged inside a space including an inside of the inner cylindrical member, the gap, between the inner circumferential wall surface of the cylindrical housing and the inner cylindrical member, serving as a gas discharge path leading to the gas discharge port, the inner cylindrical member being formed of a plurality of cylindrical members which are connected to each other in an axial direction and whose widthwise cross-sectional shape is polygonal, and a circumference wall of each of the cylindrical members having a plurality of gas inlet-outlet holes for communicating the inside of each of the cylindrical members with the gap serving as the gas discharge path, an opening of each of the plurality of cylindrical members being provided with a concave-convex portion that serves as a connecting portion of each of the cylindrical members and is connected by fitting together, the plurality of cylindrical members being supported by corner portions on outer circumferential surfaces thereof which are abutted against the inner circumferential wall surface of the cylindrical housing.

Further, the connecting portions may have a hole or a gap which allows gas to pass therethrough.

BRIEF DESCRIPTION OF DRAWINGS

The present invention will become more fully understood from the detailed description given hereinbelow and the accompanying drawings which are given by way of illustration only, and thus are no limitative of the present invention and wherein:

FIG. 1 shows a cross-sectional view in the axial direction of a gas generator of the present invention;

FIG. 2 shows a perspective view for explaining a connection method in the case of using three cylindrical members connected in the axial direction;

FIG. 3 shows a schematic cross-sectional view in the radial direction in the case of using three cylindrical members connected in the axial direction, in (a), an embodiment in which a volume of a combustion chamber is decreased, and in (b), an embodiment in which a volume of the combustion chamber is increased;

FIG. 4 shows a schematic cross-sectional view in the radial direction in the case of using two cylindrical members connected in the axial direction, in (a), an embodiment in which a volume of the combustion chamber is decreased, and in (b), an embodiment in which a volume of the combustion chamber is increased;

FIG. 5 shows a perspective view for explaining a connection method in the case of using cylindrical members of still another embodiment;

FIG. 6 shows a side view of the configuration depicted in FIG. 5;

FIG. 7 shows a perspective view for explaining a connection method in the case of using cylindrical members of still another embodiment; and FIG. 8 is a schematic cross-sectional view in the width direction that illustrates the relationship between the cylindrical housing of the gas generator and the inner cylindrical member (the cylindrical members), in (a), an embodiment in which the inner cylindrical member (the cylindrical members) with a circular cross-sectional shape is used, and in (b), an embodiment in which the inner cylindrical member (the cylindrical members) with a square cross-sectional shape is used.

DETAILED DESCRIPTION OF INVENTION

Since the output of a gas generator is adjusted according to the installation site of an airbag apparatus, an airbag capacity, or the like, a charged amount of a gas generating agent is sometimes increased or decreased even for the same gas generator.

However, in the gas generator disclosed in US-B No. 7654565, for example, when an amount of the gas generating agent is decreased, an axial length of the combustion chamber needs to be reduced, but it is difficult to reduce the axial length of the combustion chamber without degrading the combustion performance. Further, the dimensions of the inner housing 22, or the like, also need to be changed according to a length of the outer housing 12.

Conversely, when an amount of the gas generating agent is increased, the axial length of the combustion chamber needs to be increased. Thus, change in the dimensions of one component makes it necessary to change the specifications of other components.

The present invention is to provide a gas generator that makes it possible to easily increase or decrease a volume of the combustion chamber according to increase or decrease in an amount of a gas generating agent even in the same gas generator.

An ignition device is disposed at a first end of a cylindrical housing.

As the ignition device, an electric igniter used in known gas generators, or an electric igniter and a transfer charge (or a gas generating agent functioning as a transfer charge) can be used.

A diffuser portion is disposed at a second end of the cylindrical housing.

A shape and a structure of the diffuser portion are not particularly limited. For example, a diffuser portion of a cup-like shape with a flange at an opening is generally used.

If necessary, a filter can be disposed inside the diffuser portion.

Further, a diverting member can be disposed in combination with the diffuser portion to reduce temperature of a combustion gas and an amount of mist in the combustion gas by diverting the gas.

An example of such a diffuser portion and a diverting member can be a combination of the diffuser 12 and the cup-shaped member (the gas diverting device) 40 depicted in FIG. 1 of JP-A No. 2011-157025.

An inner cylindrical member is disposed in the remaining space inside the cylindrical housing where the ignition device and diffuser portion are not disposed.

A gap serving as a gas discharge path is formed between the inner cylindrical member and the cylindrical housing, and a gas generating agent is charged into a space including the inside of the inner cylindrical member.

Where a single inner cylindrical member (the inner housing 22) is used, as in the above-described gas generator disclosed in US-B No. 7654565, a volume inside the inner cylindrical member is a predetermined volume and cannot be easily changed while maintaining the performance.

Therefore, when a charged amount of the gas generating agent is decreased, it is necessary to separately use a circular retainer, or the like, and such a method cannot be employed in the case of increasing the charged amount.

In the gas generator of the present invention, the inner cylindrical member is obtained by connecting a plurality of cylindrical members in the axial direction.

The number of the cylindrical members can be selected, as appropriate, according to a length of the cylindrical housing of the gas generator or the like, but the number of the cylindrical members is preferably 2 to 6 and more preferably 2 to 4.

It is possible to use the following combinations of cylindrical members as the plurality of cylindrical members:

(I) A combination of a plurality of cylindrical members of the same shape, the same cross-sectional shape and size in the width direction, and the same length.

(II) A combination of a plurality of cylindrical members of the same shape, the same cross-sectional shape and size in the width direction, and different lengths.

(III) A combination of a plurality of cylindrical members of the same shape, the same cross-sectional shape and size, in the width direction, of the respective connecting portions and the same length, at least one of the plurality of cylindrical members having a portion which is increased or decreased in the cross-sectional area in the width direction.

(IV) A combination of a plurality of cylindrical members of the same shape, the same cross-sectional shape and size, in the width direction, of the respective connecting portions and different lengths, at least one of the plurality of cylindrical members having a portion which is increased or decreased in the cross-sectional area in the width direction.

In the combinations (III) and (IV), as the cylindrical member "having a portion which is increased or decreased in the cross-sectional area in the width direction", a cylindrical member with a cross sectional area (an outer diameter) in the width direction continuously increasing or decreasing from one end to the other end, and a cylindrical member in which a cross sectional area (an outer diameter) in the width direction is increased or decreased by forming a step from one end to the other end can be used.

When the plurality of cylindrical members are connected and used as a single inner cylindrical member, a first protrusion and a second protrusion that protrude radially outward are present at both ends thereof respectively. The first protrusion and the second protrusion each may be an inclined surface, a flange, or a combination of a plurality of projections.

The outer circumferential portion of the first protrusion on the side of the ignition device serves as the first abutment portion and is abutted against the inner circumferential wall surface of the cylindrical housing.

The surface of the second protrusion on the side of the diffuser portion serves as the second abutment portion and is abutted against part of the diffuser portion directly or with another member interposed therebetween.

The "another member" in the case where the surface of the second protrusion is abutted against part of the diffuser portion with another member interposed therebetween is, for example, the cup-shaped member (the gas diverting device) 40 in the above-described combination of the diffuser 12 and the cup-shaped member (the gas diverting device) 40 depicted in FIG. 1 of JP-A No. 2011-157025.

In addition to the abutment portions at both ends, the inner cylindrical member is also supported by the connecting portions of the plurality of cylindrical members abutted against the inner circumferential wall of the cylindrical housing.

By the first abutment portion, the second abutment portion and the connecting portions which are abutted against the inner circumferential wall of the cylindrical housing, or the diffuser portion, the inner cylindrical member is prevented from moving in the axial direction and the radial direction.

When the plurality of cylindrical members is connected and used as a single inner cylindrical member, it is necessary that the connecting portions of the plurality of cylindrical members do not easily separate but are easily separated when the number of the cylindrical members is increased or decreased.

In the present invention, the connecting portions of the cylindrical members are detachably connected because they are connected by fitting their concave-convex portions to each other.

For example, the concave-convex portion serving as the connecting portion can include a combination of a plurality of convex portions protruding radially outwardly and obliquely and concave portions present between the adjacent convex portions at an opening of one cylindrical member to be connected, and include a combination of a plurality of convex portions protruding radially outwardly and obliquely and concave portions present between the adjacent convex portions at an opening of the other cylindrical member to be connected.

The convex portions of one cylindrical member are fitted to the concave portions of the other cylindrical member, the concave portions are fitted to the convex portions, and thereby they are detachably connected.

In the gas generator of the present invention, the plurality of cylindrical members are connected axially, and a gas generating agent is charged into a space including the inside of the plurality of cylindrical members.

The gas generator of the present invention can be adapted to increase or decrease in an amount of the gas generating agent in the following manner.

When the combination (II) of the cylindrical members is used and one cylindrical member with a length of L is combined with one cylindrical member with a length of ½L (or a length of ⅓L), where an amount of the gas generating agent is decreased, a volume of the gas generating agent charging space is reduced by additionally combining one cylindrical member with a length of ½L or one cylindrical member with a length of ⅓L (in other words, a volume of the combustion chamber is reduced by increasing the volume of the gap serving as the gas discharge path, without changing the length of the cylindrical housing).

When the combination (II) of the cylindrical members is used and one cylindrical member with a length of L is combined with two cylindrical members with a length of ½L (or a length of ⅓L), where an amount of the gas generating agent is increased, a charging space volume of the gas generating agent is increased by removing one of the two cylindrical members with a length of ½L (or a length of ⅓L).

Further, where a length of the cylindrical housing is changed according to a charged amount of the gas generating agent, the number of the cylindrical members which are to be connected, is changed to meet the length.

The gas generator of the present invention is the same as the gas generator of the above-described invention, except that the connecting portions of the plurality of cylindrical members are different.

When the plurality of cylindrical members are connected and used as a single inner cylindrical member, it is necessary that the connecting portions of the plurality of cylindrical members do not easily separate but are easily separated when the number of the cylindrical members is to be increased or decreased.

In the present invention, the connecting portions of the plurality of cylindrical members are connected by abutting their flanges against each other.

The connecting portions of the plurality of cylindrical members are not axially separated before actuation by being axially pushed by the gas generating agent charged inside the cylindrical housing, or a press-fitting means provided at connecting portions.

In the gas generator, it is possible that
the respective flanges are abutted against each other in the connecting portions of the plurality of cylindrical members,
a flange (flange A) of the connecting portion of one cylindrical member has a plurality of through holes at equal intervals in the circumferential direction,
a flange (flange B) of the connecting portion of the other cylindrical member has a plurality of through holes and a plurality of projections at equal intervals in the circumferential direction,
all of the projections of the flange B are fitted in some of the through holes of the flange A, and
a hole which allows a gas to pass therethrough is formed by the remaining through holes of the flange A and all of the through holes of the flange B which are abutted against and directly face each other in the axial direction.

The flange (flange A) of the connecting portion of one cylindrical member has, for example, a total of eight through holes.

The flange (flange B) of the connecting portion of the other cylindrical member has, for example, a total of four through holes and four projections.

When two cylindrical members are connected, the four projections of the flange B are fitted in four of the eight through holes of the flange A, the remaining four through holes on the respective flanges are arranged to directly face each other in the axial direction, and thereby cylindrical members are connected. The remaining four through holes on the respective flanges function as holes which allow gas to pass therethrough.

Here, the combination of the flange A and the flange B represents a combination of flanges of the cylindrical members which are to be connected to each other. Therefore, the flange A and the flange B indicate a combination of the flange of the first cylindrical member and the flange of the second cylindrical member when there are two cylindrical members, and a combination of the flange of the first cylindrical member and the flange of the second cylindrical member and a combination of the flange of the second cylindrical member and the flange of the third cylindrical member when there are three cylindrical members. The same applies to the below-described configurations.

In the gas generator, it is possible that
the respective flanges are abutted against each other in the connecting portions of the plurality of cylindrical members,
a flange (flange A) of the connecting portion of one cylindrical member has a plurality of through holes and a plurality of projections at equal intervals in the circumferential direction,
a flange (flange B) of the connecting portion of the other cylindrical member has a plurality of projections and a plurality of through holes at equal intervals in the circumferential direction,
the total number of the through holes in the flange A and the flange B is larger than the total number of the projections, and
the projections of the flange B are fitted in the through holes of the flange A, the projections of the flange A are fitted in the through holes of the flange B, and a hole which allows a gas to pass therethrough is formed by the remaining through holes, of the respective flanges, which are abutted against and directly face each other in the axial direction.

The flange (flange A) of the connecting portion of one cylindrical member has, for example, a total of six through holes and two projections.

The flange (flange B) of the connecting portion of the other cylindrical member has, for example, a total of six through holes and two projections.

When two cylindrical members are connected, two projections of the flange B are fitted in two of the six through holes of the flange A, two projections of the flange A are fitted in two of the six through holes of the flange B, the remaining four through holes on the respective flanges are arranged to directly face each other in the axial direction, and thereby cylindrical members are connected. The remaining four through holes of the respective flanges function as holes which allow gas to pass therethrough.

In the gas generator, it is possible that
the respective flanges are abutted against each other in the connecting portions of the plurality of cylindrical members,
a flange (flange A) of the connecting portion of one cylindrical member has a plurality of through holes at equal intervals in the circumferential direction,
a flange (flange B) of the connecting portion of the other cylindrical member has a plurality of projections at equal intervals in the circumferential direction,
the flange A and the flange B have a plurality of cutouts in a portion where the projections or the through holes are not present,
the projections of the flange B are fitted in the through holes of the flange A, and a gap which allows a gas to pass therethrough is formed by the plurality of cutouts of the flange A and the plurality of cutouts of the flange B which are abutted against and directly face each other in the axial direction.

In the gas generator, it is possible that
the respective flanges are abutted against each other in the connecting portions of the plurality of cylindrical members,
a flange (flange A) of the connecting portion of one cylindrical member has a plurality of through holes and a plurality of projections at equal intervals in the circumferential direction, a flange (flange B) of the connecting portion of the other cylindrical member has a plurality of projections and a plurality of through holes at equal intervals in the circumferential direction, the flange A and the flange B have a plurality of cutouts in a portion where the projections or the through holes are not present, the projections of the flange B are fitted in the through holes of the flange A and the projections of the flange A are fitted in the through holes of the flange B, and a gap which allows a gas to pass therethrough is formed by the plurality of cutouts of the flange A and the plurality of cutouts of the flange B which are abutted against and directly face each other in the axial direction.

The through holes and the projections of the flange (flange A) of the connecting portion of one cylindrical member are combined and connected with the through holes and the projections of the flange (flange B) of the connecting portion of the other cylindrical member, and the cylindrical members are connected such that the plurality of cutouts of the respective flanges directly face each other in the axial direction. The plurality of cutout portions function as a gap which allows a gas to pass therethrough (or as a hole formed with the inner circumferential surface of the cylindrical housing).

In the gas generator of the present invention, a member with a polygonal cross-sectional shape in the width direction can be used as the plurality of cylindrical members forming the inner cylindrical member.

The polygonal shape is preferably a regular polygonal shape (for example, a square shape or a regular hexagonal shape), but it is not limited thereto.

When the plurality of cylindrical members with a polygonal cross-sectional shape in the width direction is combined, corner portions on the outer circumferential surface of the cylindrical members are abutted against the inner circumferential wall surface of the cylindrical housing, and the entire inner cylindrical member is supported at the abutment portions.

Therefore, the first abutment portion and the second abutment portion present in the above-described gas generator are not required.

Further, the connecting portions of the plurality of cylindrical members may or may not be abutted against the inner circumferential wall surface of the cylindrical housing.

Further, in the gas generators of the above-described inventions, it is possible that a cylindrical spacer or a cylindrical porous member is disposed for directly or indirectly fixing the inner cylindrical member (a combination of the plurality of cylindrical members) inside the cylindrical housing.

In the gas generators of the above-described inventions, a volume of the gas generating agent charging space is increased or decreased by increasing or decreasing the number of the cylindrical member, but when such measure is insufficient, a cylindrical spacer or a porous plate member is further combined to finely adjust the volume.

The cylindrical spacer is disposed such that the outer circumferential surface thereof is abutted against the inner circumferential surface of the cylindrical housing, an opening at one end thereof is abutted against another member (except the inner cylindrical member) and an opening at the other end is abutted against the end portion of one cylindrical member. Thereby, the inner cylindrical member (a combination of the plurality of cylindrical members) is directly fixed.

The porous plate member pushes the gas generating agent towards the inner cylindrical member with the circumferential surface thereof abutted against the inner circumferential wall surface of the cylindrical housing, and thereby, fixing the inner cylindrical member indirectly.

In the gas generator of the present invention, the plurality of cylindrical members are connected in the axial direction to be used as a single inner cylindrical member, and a volume of the gas generating agent charging space is increased or decreased by increasing or decreasing the number of the cylindrical members.

Therefore, the present invention deals with variation of output due to increase or decrease of an amount of the gas generating agent, even in the same gas generator.

DESCRIPTION OF EMBODIMENTS (1) Gas Generator Depicted in FIG. 1

An embodiment of the gas generator of the present invention will be explained hereinbelow with reference to FIGS. 1 and 2.

An igniter 16 serving as an ignition device is attached at a first end 10a of a cylindrical housing 10. The igniter 16 is a known electric igniter fixed to a collar 17. An ignition portion 16a including an ignition charge protrudes from the collar 17.

A diffuser portion 12 is attached at a second end 10b of the cylindrical housing 10.

The diffuser portion 12 has a substantially cup-like shape having a flange 12a, a circumferential wall 12b and a bottom 12c. The diffuser portion is fixed by welding to the cylindrical housing 10 at the flange 12a.

A plurality of gas discharge ports 15 are formed in the circumferential wall 12b.

A first porous plate member 14 is disposed on the side of the igniter 16 in the cylindrical housing 10 at a distance from the igniter 16. In the first porous plate member 14, an annular wall 14a is formed at a circumferential edge of a circular bottom surface. The first porous plate member 14 is fixed by the annular wall 14a press-fitting to the inner wall surface of the cylindrical housing 10.

The space surrounded by the igniter 16 (the igniter 16 and the collar 17), the cylindrical housing 10 and the first porous plate member 14 is a first combustion chamber 20. A first gas generating agent 22 is charged in the first combustion chamber 20.

The first gas generating agent 22 is in contact with the ignition portion 16a of the igniter 16. Through holes (not depicted in the drawing) in the first porous plate member 14 are openings which are smaller in size than the first gas generating agent 22. The through holes may be closed with a seal tape.

A gas generating agent, which has good ignition ability and sustains combustion (high combustion temperature), can be used as the first gas generating agent 22.

The combustion temperature of the first gas generating agent 22 is desirably within a range of 1700° C. to 3000° C. For example, a disk-shaped agent which includes nitroguanidine (34 mass %) and strontium nitrate (56 mass %) and has an outer diameter of 1.5 mm and a thickness of 1.5 mm can be used as the first gas generating agent.

The first gas generating agent 22 is held in a state of being pushed by the first porous plate member 14 towards the igniter 16.

A cup member 65 serving as a gas diverting device is disposed at the end portion (the opposite end portion 10*b*) inside the cylindrical housing 10 on the side of the diffuser portion 12.

The cup member 65 has a bottom surface 65*a* and a circumferential wall 65*b*. The circumferential wall 65*b* has a plurality of communication holes 65*c*.

The cup member 65 is fixed by a known method (welding, or the like) to the flange 12*a* of the diffuser portion 12. The opening of the cup member 65 is closed with a seal tape 66 to prevent the penetration of humidity from the gas discharge ports 15.

The outer diameter of the cup member 65 is smaller than the inner diameter of the cylindrical housing 10. Therefore, a gap 67 is present between the circumferential wall 65*b* and the inner circumferential wall surface of the cylindrical housing 10, this gap serving as a pocket portion (a gap) 67 with a dead end at the flange 12*a* of the diffuser portion.

Since the pocket portion 67 is contiguous with a cylindrical space (a gap) 60, the pocket portion functions to retain the mist in the combustion gas.

Three components, namely, a first cylindrical member 30, a second cylindrical member 40, and a third cylindrical member 50, are connected in the above-described order from the side of the igniter 16 to the side of the diffuser portion 12 inside the cylindrical housing 10.

Among the three cylindrical members, a length of the third cylindrical member 50 is the largest. Where the length of the third cylindrical member 50 is taken as L, a length of the first cylindrical member 30 and a length of the second cylindrical member 40 each are ½L.

The first cylindrical member 30, the second cylindrical member 40 and the third cylindrical member 50 each have a circular cross-sectional shape and the identical inner diameter.

The cylindrical members can be combined such that the first cylindrical member 30 has the largest inner diameter, the third cylindrical member 50 has the smallest inner diameter, and the second cylindrical member 40 has an intermediate inner diameter, or such that the relation of the inner diameters is reversed.

The cylindrical space 60 which is continuous in the X-axis direction and functions as a gas discharge path is formed between the inner circumferential wall surface 11 of the cylindrical housing and the first cylindrical member 30, the second cylindrical member 40 and the third cylindrical member 50.

The first end of the first cylindrical member 30 on the side of the igniter 16 has a first annular inclined surface 31 which is enlarged in diameter radially outward.

As depicted in FIG. 2, the second end of the first cylindrical member 30, which is opposite to the first end thereof, has a first concave-convex portion 34 including a combination of a plurality of convex portions 32 that protrudes radially outwardly and obliquely and concave portions 33 present between the adjacent convex portions 32.

The convex portions 32 and the concave portions 33 are formed equidistantly in the circumferential direction, but there are portions in about one or two locations where the convex portions 32 are not present.

The first cylindrical member 30 has a plurality of first gas inlet-outlet holes 37 in the thickness direction. The first gas inlet-outlet holes 37 are formed equidistantly in the circumferential direction and can be formed in one or two or more separate locations in the X-axis direction. The first annular inclined surface 31 can have the shape same as that of the first concave-convex portion 34.

As depicted in FIG. 2, the first end of the second cylindrical member 40 on the side of the first cylindrical member 30 and the second end of the second cylindrical member on the opposite side have a 2*a*-th concave-convex portion 44*a* and a 2*b*-th concave-convex portion 44*b*, respectively. Each concave-convex portion includes a combination of a plurality of convex portions 42 that protrudes radially outwardly and obliquely and concave portions 43 present between the adjacent convex portions 42.

The convex portions 42 and the concave portions 43 are formed equidistantly in the circumferential direction, but there are portions in about one or two locations where the convex portions 42 are not present.

The second cylindrical member 40 has a plurality of second gas inlet-outlet holes 47 in the thickness direction. The second gas inlet-outlet holes 47 are formed equidistantly in the circumferential direction and can be formed in one or two or more separate locations in the X-axis direction.

The second cylindrical member 40 has a plurality of second gas inlet-outlet holes 47 in the thickness direction. The second gas inlet-outlet holes 47 are formed equidistantly in the gas inlet-outlet direction and can be formed in one or two or more separate locations in the X-axis direction.

As depicted in FIG. 2, the first end of the third cylindrical member 50 on the side of the second cylindrical member 40 has a third concave-convex portion 54 including a combination of a plurality of convex portions 52 that protrudes radially outwardly and obliquely and concave portions 53 present between the adjacent convex portions 52.

The convex portions 52 and the concave portions 53 are formed equidistantly in the circumferential direction, but the convex portions 52 are not present in about one or two locations.

The second end of the third cylindrical member 50 on the opposite side of the first end has a third annular inclined surface 51 which is enlarged in diameter radially outward.

The third annular inclined surface 51 has a plurality of through holes or cutouts in the thickness direction. The third annular inclined surface 51 can have the same shape as the third concave-convex portion 54.

The third cylindrical member 50 has a plurality of third gas inlet-outlet holes 57 in the thickness direction. The third gas inlet-outlet holes 57 are formed equidistantly in the circumferential direction and can be formed in two or three or more separate locations in the X-axis direction.

The arrangement of the first gas inlet-outlet holes 37 of the first cylindrical member 30, the second gas inlet-outlet holes 47 of the second cylindrical member 40 and the third gas inlet-outlet holes 57 of the third cylindrical member 50 is not particularly limited, and the arrangement thereof can be such that the number of the gas inlet-outlet holes increases towards the diffuser portion 12.

The first annular inclined surface 31 serving as the first protrusion of the first cylindrical member 30 is supported with an outer circumferential portion 31*a* thereof abutting against the inner circumferential wall surface 11 of the cylindrical housing (a first abutment portion).

The first concave-convex portion 34 of the first cylindrical member 30 and the 2*a*-th concave-convex portion 44*a* of the second cylindrical member 40 are fitted and connected such that the concave portions and convex portions thereof are engaged with each other, and the connecting portions are abutted against the inner circumferential wall surface 11 of the cylindrical housing. Here, since the first concave-convex portion 34 and the 2*a*-th concave-convex portion 44*a* have portions where the convex portions are not present, these portions serve as a gas discharge path in the cylindrical space 60.

The 2b-th concave-convex portion 44b of the second cylindrical member 40 and the third concave-convex portion 54 of the third cylindrical member 50 are fitted and connected such that the concave portions and the convex portions thereof are engaged with each other, and the connecting portions are abutted against the inner circumferential wall surface 11 of the cylindrical housing. Here, since the 2b-th concave-convex portion 44b and the third concave-convex portion 54 have portions where the convex portions are not present, these portions serve as a gas discharge path in the cylindrical space 60.

The third annular inclined surface 51 serving as a second protrusion of the third cylindrical member 50 is supported by abutting against the boundary of the bottom surface 65a and the circumferential wall 65b of the cup member 65 (a second abutment portion). Since the third annular inclined surface 51 has the through holes or cutouts, these portions serve as a gas discharge path in the cylindrical space 60.

The first annular inclined surface 31 serving as the first protrusion and the third annular inclined surface 51 serving as the second protrusion can be a flange same as the first flange 131 depicted in FIG. 5 or a flange (the hole 232 is not required) same as the first flange 231 depicted in FIG. 7.

A second porous plate member 24 is disposed between the first cylindrical member 30 and the first porous plate member 14.

In the second porous plate member 24, an annular wall 24a is formed at the circumferential edge of a circular bottom surface. The second porous plate member is fixed with the annular wall 24a in press-contact with the inner circumferential wall surface of the cylindrical housing 10.

A space 18 is formed between the second porous plate member 24 and the first porous plate member 14. The annular wall 24a extends towards the igniter 16.

A second combustion chamber 25 is defined and surrounded by the second porous plate member 24, the first cylindrical member 30, the second cylindrical member 40, the third cylindrical member 50 and part of the cylindrical housing 10.

A second gas generating agent 70 is charged into the second combustion chamber 25. Through holes (not depicted in the drawing) in the second porous plate member 24 are openings which are smaller in size than the second gas generating agent 70. The through holes may be closed with a seal tape.

A gas generating agent with a combustion temperature lower than that of the first gas generating agent 22 is used as the second gas generating agent 70. The combustion temperature of the second gas generating agent 70 is desirably within a range of 1000° C. to 1700° C. For example, a single-perforated columnar agent, which includes guanidine nitrate (41 mass %), basic copper nitrate (49 mass %), and a binder or an additive and has an outer diameter of 1.8 mm, an inner diameter of 0.7 mm, and a length of 1.9 mm, can be used.

The second gas generating agent 70 is held in a state of being pushed by the second porous plate member 24 toward the diffuser portion 12.

As a result, the second gas generating agent 70 inside the second combustion chamber 25 is densely charged, and the second gas generating agent is prevented from moving and forming a gap. At the same time, the first cylindrical member 30 is also indirectly pushed in the X-axis direction and fixed.

In the gas generator depicted in FIG. 1, the first cylindrical member 30 may be fixed directly by a cylindrical spacer or a cylindrical porous member. The cylindrical spacer or the cylindrical porous member can be disposed between the first annular inclined surface 31 of the first cylindrical member 30 and the second porous plate member 24 to abut thereagainst.

A method for assembling the gas generator depicted in FIG. 1 will be explained hereinbelow.

The diffuser portion 12 having the gas discharge ports 15 is fixed by welding to the opening of the cylindrical housing 10 on the side of the second end 10b.

Then, the cup member (the gas diverting device) 65 is attached to the flange 12a so that the opening thereof faces the diffuser portion 12.

Then, the combination of the first cylindrical member 30, the second cylindrical member 40 and the third cylindrical member 50, which are connected and integrated in advance, is press-inserted from the first end 10a of the cylindrical housing 10.

A prescribed amount of the second gas generating agent 70 is then charged, with tapping, into the space (a gas generating agent charging space) serving as the second combustion chamber 25, and the second porous plate member 24 is thereafter press-inserted. Since the second gas generating agent 70 is densely charged and prevented from moving by press-inserting the second porous plate member 24, the occurrence of gaps inside the second combustion chamber 25 is prevented. The first cylindrical member 30 is also fixed by being pressed via the gas generating agent 70.

The first porous plate member 14 is then press-inserted, and the first gas generating agent 22 is charged so as to abut against the first porous plate member 14. Initially, the first porous plate member 14 is disposed close to the first end 10a, and when the collar 17 is inserted from the first end 10a, the first porous plate member 14 is pushed deeper together with the first gas generating agent 22.

Thereafter, the igniter 16 fixed to the collar 17 is then attached, and the first combustion chamber 20 is formed.

When a charged amount of the second gas generating agent 70 is increased, the second cylindrical member 40 in FIG. 1 is removed and a combination of the first cylindrical member 30 and the third cylindrical member 50 is used.

By so replacing the three cylindrical members with the two cylindrical members, it is possible to increase a volume of the second combustion chamber 25 and also increase an amount of the gas generating agent 70 to be charged.

The operation of the gas generator depicted in FIG. 1 will be explained hereinbelow.

Where the first gas generating agent 22 in the first combustion chamber 20 burns by actuation of the igniter 16, a combustion product (a flame or a high-temperature gas) is generated therefrom, passes through the pores of the first porous plate member 14 and enters the space 18. Further, since the first gas generating agent 22 is densely charged into the first combustion chamber 20, uneven ignitions (the uneven burnings) are unlikely to occur, and the first gas generating agent 22 is burnt uniformly. The combustion product advances into the space 18.

The combustion product passes from the space 18 through the through holes of the second porous plate member 24 and ignites the second gas generating agent 70 present inside the second combustion chamber 25.

The combustion product generated from the first combustion chamber 20 once enters the space 18, and thereby the second gas generating agent 70 adjacent to the second porous plate member 24 starts burning uniformly from the end surface. Therefore, the uneven ignition is unlikely to occur.

The combustion gas and the combustion product flow toward the diffuser portion 12, while repeatedly moving into and out of the cylindrical space 60 through the first gas inlet-outlet holes 37 of the first cylindrical member 30, the second gas inlet-outlet holes 47 of the second cylindrical member 40 and the third gas inlet-outlet holes 57 of the third cylindrical member 50.

In this process, combustion residues adhere to the inner circumferential wall surface 11 of the cylindrical housing and are held thereon.

Further, the combustion gas and the combustion product collide with the flange 12a of the diffuser portion 12, change the direction and enter the cup member 65 via the communication holes 65c. In this process, the residue is also collected in the pocket portion 67.

The combustion gas and combustion product then collide with the bottom 12c of the diffuser portion 12, change the direction and are discharged from the gas discharge ports 15.

Since the gas generator of the present invention has the above-described structure, the uneven ignition of the gas generating agent is suppressed and the ignition and combustion performance is enhanced on the whole. In particular, in a gas generator with a structure in which the housing has a shape elongated in the axial direction and the first combustion chamber and the second combustion chamber are adjacent in the axial direction, smooth combustion of the gas generating agent is realized and the gas generator that is rapidly actuated is obtained.

(2) Gas Generator of Another Embodiment

Another embodiment will be explained hereinbelow with reference to FIGS. 3 and 4.

In the gas generator depicted in (a) in FIG. 3, a combination of three components of the same length and inner diameter is used, namely, a first cylindrical member 101, a second cylindrical member 102 and a third cylindrical member 103.

The first cylindrical member 101, the second cylindrical member 102 and the third cylindrical member 103 are connected in the same manner as the first cylindrical member 30, the second cylindrical member 40 and the third cylindrical member 50 depicted in FIG. 1.

When it is necessary to increase a charged amount of the gas generating agent 70 in the gas generator depicted in (a) in FIG. 3, the second cylindrical member 102 is removed and a combination of the first cylindrical member 101 and the third cylindrical member 103 is used as depicted in (b) in FIG. 3.

As a result, a volume of the combustion chamber 25 is increased and a charged amount of the gas generating agent 70 is increased.

Conversely, when it is necessary to decrease a charged amount of the gas generating agent 70, the configuration depicted in (b) in FIG. 3 is replaced with that depicted in (a) in FIG. 3.

In the gas generator depicted in (a) in FIG. 4, a combination of two components of the same length and inner diameter, namely, a first cylindrical member 201 and a second cylindrical member 202.

The first cylindrical member 201 and the second cylindrical member 202 are connected in the same manner as the first cylindrical member 30 and the third cylindrical member 50 depicted in FIG. 1.

When it is necessary to increase a charged amount of the gas generating agent 70 in the gas generator depicted in (a) in FIG. 4, the second cylindrical member 202 is replaced with a third cylindrical member 203 of a smaller length, and a combination of the first cylindrical member 201 and the third cylindrical member 203 is used as depicted in (b) in FIG. 4.

As a result, a volume of the combustion chamber 25 is increased, and a charged amount of the gas generating agent 70 is increased.

Conversely, when it is necessary to decrease a charged amount of the gas generating agent 70, the configuration depicted in (b) in FIG. 4 is replaced with that depicted in (a) in FIG. 4.

The number of the cylindrical members which are to be assembled is adjusted not only according to a charged amount of the gas generating agent 70, but also according to a length of the cylindrical housing 10.

(3) Gas Generator Having an Inner Cylindrical Member Depicted in FIGS. 5 and 6

An inner cylindrical member (a combination of a plurality of cylindrical members) of another embodiment will be explained hereinbelow with reference to FIGS. 5 and 6.

In the first cylindrical member 30, the second cylindrical member 40 and the third cylindrical member 50 depicted in FIG. 1, each of the connecting portions thereof has a combination of the concave portions and the convex portions depicted in FIG. 2, but in the inner cylindrical member depicted in FIG. 5, the connecting portion has flanges.

A first cylindrical member 130 in FIG. 5 corresponds to the first cylindrical member 30 in FIGS. 1 and 2, and a second cylindrical member 140 corresponds to the second cylindrical member 40 in FIGS. 1 and 2.

The first cylindrical member 130 has a first flange 131 on the side of the connecting portion with the second cylindrical member 140 and also has a plurality of first gas inlet-outlet holes 137 in the circumferential surface.

The first flange 131 has eight first through holes 132 arranged equidistantly in the circumferential direction.

The second cylindrical member 140 has a second flange 141 on the side of the connecting portion with the first cylindrical member 130 and also has a plurality of second gas inlet-outlet holes 147 in the circumferential surface.

The second flange 141 has four second through holes 142 and four second projections 143 arranged equidistantly in the circumferential direction.

As depicted in FIG. 6, the first cylindrical member 130 and the second cylindrical member 140 are detachably connected by fitting the four second projections 143 of the second flange 141 into the four first through holes 132 of the first flange 131.

In this case, the four remaining first through holes 132 of the first flange 131 and the four second through holes 142 of the second flange 141 are abutted against and connected to each other, so as to directly face each other in the axial direction. The connecting portions of the four first through holes 132 and the four second through holes 142 serve as gas discharge paths in the cylindrical space 60.

In the inner cylindrical member formed by the cylindrical members depicted in FIGS. 5 and 6, the first protrusion of the first cylindrical member 130 can be one of the first annular inclined surface 31 same as depicted in FIG. 1, a flange same as the first flange 131 depicted in FIG. 5, and a flange (the holes 232 are not required) same as the first flange 231 depicted in FIG. 7.

(4) Gas Generator Having an Inner Cylindrical Member Depicted in FIG. 7

An inner cylindrical member (a combination of a plurality of cylindrical members) of still another embodiment will be explained hereinbelow with reference to FIG. 7.

In the first cylindrical member 30, the second cylindrical member 40 and the third cylindrical member 50 depicted in FIG. 1, each of the connecting portions thereof has a combination of the concave portions and the convex portions depicted in FIG. 2, but in the inner cylindrical member depicted in FIG. 7, the connecting portion has flanges.

A first cylindrical member 230 in FIG. 7 corresponds to the first cylindrical member 30 in FIGS. 1 and 2, and a second cylindrical member 240 corresponds to the second cylindrical member 40 in FIGS. 1 and 2.

The first cylindrical member 230 has a first flange 231 on the side of the connecting portion with the second cylindrical member 240 and also has a plurality of first gas inlet-outlet holes 237 in the circumferential surface.

The first flange 231 is divided into four sections (has four protruding pieces 231) by four cutout portions 233 formed equidistantly in the circumferential direction. Each of the four divided first flanges 231 (the four protruding pieces 231) has a first through hole 232.

The second cylindrical member 240 has a second flange 241 on the side of the connecting portion with the first cylindrical member 230 and also has a plurality of second gas inlet-outlet holes 247 in the circumferential surface.

The second flange 241 is divided into four sections (has four protruding pieces 241) by four cutout portions 243 formed equidistantly in the circumferential direction. Each of the four divided second flanges 241 (the four protruding pieces 241) has a second projection 242.

The first cylindrical member 230 and the second cylindrical member 240 are detachably connected by fitting the four second projections 242 of the second flange 241 into the four first through holes 232 of the first flange 231.

In this case, the four cutout portions 233 of the first flange 231 and the four cutout portions 243 of the second flange 241 are abutted against and connected to each other, so as to directly face each other in the axial direction.

The connecting portions of the four cutout portions 233 and the four cutout portions 243 serve as gas discharge paths in the cylindrical space 60.

In the inner cylindrical member formed by the cylindrical members depicted in FIG. 7, the first protrusion of the first cylindrical member 230 can be one of the first annular inclined surface 31 same as depicted in FIG. 1, a flange same as the first flange 131 depicted in FIG. 5 and a flange (the holes 232 are not required) same as the first flange 231 depicted in FIG. 7.

(5) Gas Generator Having an Inner Cylindrical Member with a Cross-Sectional Shape in the Width Direction Depicted in FIG. 8

Where the cross section of the first cylindrical member 30, the second cylindrical member 40 and the third cylindrical member 50 in the width direction has a circular shape as depicted in (a) in FIG. 8, a cylindrical space 60 which is continuous in the circumferential direction and also continuous in the X-axis direction is formed between the outer surfaces of the first cylindrical member 30, the second cylindrical member 40 and the third cylindrical member 50 and the inner circumferential wall surface 11 of the cylindrical housing.

Where the cross section of the first cylindrical member 30, the second cylindrical member 40 and the third cylindrical member 50 in the width direction has a square shape as depicted in (b) in FIG. 8, the space 60 which is divided in four sections in the circumferential direction and is continuous in the X-axis direction is formed between the outer surfaces of the first cylindrical member 30, the second cylindrical member 40 and the third cylindrical member 50 and the inner circumferential wall surface 11 of the cylindrical housing.

Further, where the cross section of the first cylindrical member 30, the second cylindrical member 40 and the third cylindrical member 50 in the width direction has a regular triangular shape, the space 60 which is divided in three sections in the circumferential direction and is continuous in the X-axis direction is formed. And where the cross section of the first cylindrical member 30, the second cylindrical member 40 and the third cylindrical member 50 in the width direction has a regular hexagonal shape, the space 60 which is divided in six sections in the circumferential direction and is continuous in the X-axis direction is formed.

Where the combination of the plurality of cylindrical members having a cross-sectional shape such as depicted in (b) in FIG. 8 is used, the corner portions of the outer circumferential surfaces of the plurality of cylindrical members are abutted against and supported by the inner circumferential wall surface of the cylindrical housing.

Therefore in this case, unlike in the embodiment (FIG. 1) in which the plurality of cylindrical members with a circular cross section are combined as depicted in (a) in FIG. 8, the following portions are not needed: the first annular inclined surface 31, the portion (the first abutment portion) in which the outer circumference portion 31a of the first annular inclined surface 31 is abutted against the inner circumferential wall surface 11 of the cylindrical housing, the third annular inclined surface 51 and the second abutment portion in which the third annular inclined surface 51 is abutted against the boundary between the bottom surface 65a and the circumferential wall 65b of the cup member 65.

The connecting portions of the plurality of cylindrical members can be the combination of the concave-convex portion 34 and the concave-convex portion 44a and the combination of the concave-convex portion 44b and the concave-convex portion 54, depicted in FIG. 2, or the combination of the four protruding pieces 231 having through holes and the four protruding pieces 241 having projections depicted in FIG. 7. Alternatively, it is possible to form a concave portion in the center in the width direction at the opening of each surface forming the cylindrical member, and engage and connect the concave portions together by shifting the cylindrical members with respect to each other in the circumferential direction.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:
1. A gas generator, comprising:
a cylindrical housing in which an ignition device is disposed at a first end thereof and a diffuser portion provided with a gas discharge port is disposed at a second end thereof, axially opposite to the first end,
an inner cylindrical member being disposed inside the cylindrical housing and defining a gap with an inner circumferential wall surface of the cylindrical housing, a gas generating agent being charged inside a space defined inside of the inner cylindrical member, the gap, defined between the inner circumferential wall surface of the cylindrical housing and the inner cylindrical member, serving as a gas discharge path leading to the gas discharge port, the inner cylindrical member being formed of a plurality of cylindrical members which are connected to each other in an axial direction, a circumference wall of each of the cylindrical members having a plurality of gas inlet-outlet holes for communicating the space inside each of the cylindrical members with the gap, an opening of each of the plurality of cylindrical members being provided with a concave-convex portion that serves as a connecting portion of each of the cylindrical members and the plurality of cylindrical members is connected by fitting the concave-convex portion together, the concave-convex portion to serve as the connecting portion including, a combination of a plurality of convex portions protruding radially outwardly and obliquely and a plurality of concave portions present between adjacent convex portions, provided at the opening of one cylindrical member to be connected, and a combination of a plurality of convex portions protruding radially outwardly and obliquely and a plurality of concave portions present between adjacent convex portions, provided at the opening of another cylindrical member to be connected, the connected plurality of cylindrical members having a protrusion, which protrudes outward in the radial direction, at an end portion on a side of the ignition device and at an end portion on a side of the diffuser portion, the connecting portions of the plurality of cylindrical members being connected with each other such that the respective concave portions are fitted to and engaged with the respective convex portions, an outer circumferential portion of a first protrusion on the side of the ignition device serving as a first abutment portion and being abutted against the inner circumferential wall surface of the cylindrical housing, a surface of a second protrusion on the side of the diffuser portion serving as a second abutment portion and being abutted against part of the diffuser portion directly or with another member interposed therebetween, the connecting portions of the plurality of cylindrical members being abutted against the inner circumferential wall surface of the cylindrical housing, the connecting portions, the first abutment portion, and the second abutment portion having a hole or a cutout which allows gas to pass therethrough.

2. A gas generator, comprising:

a cylindrical housing in which an ignition device is disposed at a first end thereof and a diffuser portion provided with a gas discharge port is disposed at a second end thereof axially opposite to the first end, an inner cylindrical member being disposed inside the cylindrical housing and defining a gap with an inner circumferential wall surface of the cylindrical housing, a gas generating agent being charged inside a space defined inside of the inner cylindrical member, the gap, defined between the inner circumferential wall surface of the cylindrical housing and the inner cylindrical member, serving as a gas discharge path leading to the gas discharge port, the inner cylindrical member being formed of a plurality of cylindrical members which are connected to each other in an axial direction, a circumference wall of each of the cylindrical members having a plurality of gas inlet-outlet holes for communicating the space inside each of the cylindrical members with the gap, an opening of each of the plurality of cylindrical members being provided with a flange that serves as a connecting portion of the respective cylindrical members and is abutted with each other, the connected plurality of cylindrical members having a protrusion, which protrudes outward in the radial direction, at an end portion on a side of the ignition device and at an end portion on a side of the diffuser portion, in the connecting portions of the connected plurality of cylindrical members, respective flanges being abutted against each other, an outer circumferential portion of a first protrusion on the side of the ignition device serving as a first abutment portion and being abutted against the inner circumferential wall surface of the cylindrical housing, and a surface of a second protrusion on the side of the diffuser portion serving as a second abutment portion and being abutted against part of the diffuser portion directly or with another member interposed therebetween, the connecting portions, the first abutment portion, and the second abutment portion having a hole or a cutout which allows gas to pass therethrough.

3. The gas generator according to claim 2, wherein the respective flanges are abutted against each other in the connecting portions of the plurality of cylindrical members, a flange (flange A) of the connecting portion of one cylindrical member has a plurality of through holes at equal intervals in a circumferential direction, a flange (flange B) of the connecting portion of another cylindrical member has a plurality of through holes and a plurality of projections at equal intervals in the circumferential direction, all of the projections of the flange B are fitted in some of the through holes of the flange A, and a hole which allows a gas to pass therethrough is formed by the remaining through holes of the flange A and all of the through holes of the flange B which are abutted against and directly face each other in the axial direction.

4. The gas generator according to claim 2, wherein the respective flanges are abutted against each other in the connecting portions of the plurality of cylindrical members, a flange (flange A) of the connecting portion of one cylindrical member has a plurality of through holes and a plurality of projections at equal intervals in a circumferential direction, a flange (flange B) of the connecting portion of another cylindrical member has a plurality of projections and a plurality of through holes at equal intervals in the circumferential direction, the total number of the through holes in the flange A and the flange B is larger than the total number of the projections, and the projections of the flange B are fitted in the through holes of the flange A, the projections of the flange A are fitted in the through holes of the flange B, and a hole which allows a gas to pass therethrough is formed by the remaining through holes, of the respective flanges, which are abutted against and directly face each other in the axial direction.

5. The gas generator according to claim 2, wherein
the respective flanges are abutted against each other in the connecting portions of the plurality of cylindrical members,
a flange (flange A) of the connecting portion of one cylindrical member has a plurality of through holes at equal intervals in a circumferential direction,
a flange (flange B) of the connecting portion of another cylindrical member has a plurality of projections at equal intervals in the circumferential direction,
the flange A and the flange B have a plurality of cutouts in a portion where the projections or the through holes are not present,
the projections of the flange B are fitted in the through holes of the flange A, and a gap which allows a gas to pass therethrough is formed by the plurality of cutouts of the flange A and the plurality of cutouts of the flange B which are abutted against and directly face each other in the axial direction.

6. The gas generator according to claim 2, wherein
the respective flanges are abutted against each other in the connecting portions of the plurality of cylindrical members,
a flange (flange A) of the connecting portion of one cylindrical member has a plurality of through holes and a plurality of projections at equal intervals in a circumferential direction,
a flange (flange B) of the connecting portion of another cylindrical member has a plurality of projections and a plurality of through holes at equal intervals in the circumferential direction,
the flange A and the flange B have a plurality of cutouts in a portion where the projections or the through holes are not present,
the projections of the flange B are fitted in the through holes of the flange A and the projections of the flange A are fitted in the through holes of the flange B, and a gap which allows a gas to pass therethrough is formed by the plurality of cutouts of the flange A and the plurality of cutouts of the flange B which are abutted against and directly face each other in the axial direction.

7. A gas generator, comprising:
a cylindrical housing in which an ignition device is disposed at a first end thereof and a diffuser portion provided with a gas discharge port is disposed at a second end thereof axially opposite to the first end,
an inner cylindrical member being disposed inside the cylindrical housing and defining a gap with an inner circumferential wall surface of the cylindrical housing, a gas generating agent being charged inside a space defined inside of the inner cylindrical member,
the gap, defined between the inner circumferential wall surface of the cylindrical housing and the inner cylindrical member, serving as a gas discharge path leading to the gas discharge port,
the inner cylindrical member being formed of a plurality of cylindrical members which are connected to each other in an axial direction and whose widthwise cross-sectional shape is polygonal, and a circumference wall of each of the cylindrical members having a plurality of gas inlet-outlet holes for communicating the space inside each of the cylindrical members with the gap,
an opening of each of the plurality of cylindrical members being provided with a concave-convex portion that serves as a connecting portion of each of the cylindrical members and the plurality of cylindrical members is connected by fitting the concave-convex portion together,
the plurality of cylindrical members being supported by corner portions on outer circumferential surfaces thereof which are abutted against the inner circumferential wall surface of the cylindrical housing, and
the connecting portions having a hole or a cutout which allows a gas to pass therethrough.

8. The gas generator according to claim 1, wherein the plurality of cylindrical members are a combination of a plurality of cylindrical members of the same shape, the same cross-sectional shape and cross-sectional area in a width direction, and the same length or different lengths.

9. The gas generator according to claim 1, wherein a cylindrical spacer or a cylindrical porous member is disposed for directly or indirectly fixing the inner cylindrical member inside the cylindrical housing.

10. The gas generator according to claim 2, wherein the plurality of cylindrical members are a combination of a plurality of cylindrical members of the same shape, the same cross-sectional shape and cross-sectional area in a width direction, and the same length or different lengths.

11. The gas generator according to claim 2, wherein a cylindrical spacer or a cylindrical porous member is disposed for directly or indirectly fixing the inner cylindrical member inside the cylindrical housing.

12. The gas generator according to claim 7, wherein the plurality of cylindrical members are a combination of a plurality of cylindrical members of the same shape, the same cross-sectional shape and cross-sectional area in a width direction, and the same length or different lengths.

13. The gas generator according to claim 7, wherein a cylindrical spacer or a cylindrical porous member is disposed for directly or indirectly fixing the inner cylindrical member inside the cylindrical housing.

* * * * *